United States Patent
Ittel

(10) Patent No.: US 7,868,333 B2
(45) Date of Patent: Jan. 11, 2011

(54) PROCESS FOR DEMETALLIZATION OF CARBON NANOTUBES

(75) Inventor: Steven Dale Ittel, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 357 days.

(21) Appl. No.: 11/946,044

(22) Filed: Nov. 28, 2007

(65) Prior Publication Data

US 2009/0012200 A1 Jan. 8, 2009

Related U.S. Application Data

(60) Provisional application No. 60/871,337, filed on Dec. 21, 2006.

(51) Int. Cl.
- *C09C 1/44* (2006.01)
- *C09C 1/46* (2006.01)
- *D01F 9/12* (2006.01)

(52) U.S. Cl. ............ 257/79; 423/447.5; 423/448; 423/460; 423/461; 423/447.1; 522/71; 430/270.1; 430/319

(58) Field of Classification Search .......... 205/555; 423/460, 461, 448, 447; 106/31.95; 977/742, 977/845; 522/71; 210/633; 430/319, 270.1
See application file for complete search history.

(56) References Cited

U.S. PATENT DOCUMENTS

| | | | |
|---|---|---|---|
| 5,866,434 A * | 2/1999 | Massey et al. | 436/526 |
| 6,183,714 B1 | 2/2001 | Smalley et al. | |
| 6,752,977 B2 * | 6/2004 | Smalley et al. | 423/447.1 |
| 6,872,330 B2 * | 3/2005 | Mack et al. | 252/378 R |
| 6,875,412 B2 * | 4/2005 | Margrave et al. | 423/447.2 |
| 7,449,081 B2 * | 11/2008 | Bouchard et al. | 156/247 |
| 7,488,875 B2 * | 2/2009 | Bahr et al. | 423/445 B |
| 7,537,682 B2 * | 5/2009 | Dailly et al. | 205/555 |
| 2002/0127171 A1 * | 9/2002 | Smalley et al. | 423/447.6 |

FOREIGN PATENT DOCUMENTS

CN 1485271 7/2008
WO WO 2004020714 A1 * 3/2004

OTHER PUBLICATIONS

Feng et al., Removal of Some Impurities From Carbon Nanotubes, Chem. Phys. Lett., 2003, vol. 375:645-648.

* cited by examiner

*Primary Examiner*—Susan W Berman

(57) ABSTRACT

Processes are provided for removing metal-based catalyst residues from carbon nanotubes by contacting the carbon nanotubes with an active metal agent and carbon monoxide.

18 Claims, No Drawings

PROCESS FOR DEMETALLIZATION OF CARBON NANOTUBES

FIELD OF THE INVENTION

The present invention relates to processes for removing metal impurities, such as metal-based catalyst residues, from carbon nanotubes.

TECHNICAL BACKGROUND

Carbon nanotubes (CNTs) are self-assembling nanostructures comprised of graphite sheets rolled up into cylinders. Such nanostructures are termed single-walled carbon nanotubes (SWNTs) if they are comprised of a single cylindrical tube. CNTs comprising two or more concentric tubes are termed double-walled carbon nanotubes (DWNTs) and multi-wall carbon nanotubes (MWNTs), respectively. The diameters of SWNTs typically range from 0.4 nm to ca. 3 nm, and the lengths from ca. 10 nm to a few centimeters.

Whether made by laser ablation, chemical vapor deposition or other techniques, the carbon nanotubes often contain catalyst residues from their synthesis. In many applications, those catalyst residues are detrimental to the final end-use application.

A variety of methods for de-metallization of carbon nanotubes have been developed, but they typically rely upon the use of oxidizing conditions in strong acids. Such conditions will remove much of the catalyst residue, and will even remove carbon species such as amorphous carbon. However, these aggressive processes can also result in severe damage to, and loss of, CNTs.

Chinese patent application CN1485271A discloses a method to remove Co, Ni and Fe in CNTs by heating them under hydrogen to 650° C. and then CO gas at 150-200° C. before removing the metals under vacuum.

A non-destructive mild oxidation method of removing some impurities from as-grown carbon nanotubes, including single-wall carbon nanotubes and multi-wall carbon nanotubes, by $H_2O_2$ oxidation and HCl treatment has been investigated (Feng et al., Chem. Phys. Lett. 2003, 375, 645-648).

An efficient, industrial scale purification process to remove these impurities is desired, as many of the applications of CNTs require highly-purified CNTs with low levels of damage to the CNT structure. A high-yield method that removes the catalyst residues from the carbon nanotubes, that does not require strong acid oxidation, and that leaves the carbon nanotubes in an unoxidized form, would be of considerable value.

SUMMARY OF THE INVENTION

One aspect of the present invention is a process comprising:
 a) forming a first suspension of carbon nanotubes containing metal residues in a first solvent;
 b) contacting the first suspension with an active metal agent to form a second suspension of carbon nanotubes containing metal residues;
 c) contacting the second suspension with carbon monoxide gas to form carbon monoxide-treated carbon nanotubes; and
 d) isolating the carbon monoxide-treated carbon nanotubes.

Another aspect of the present invention is a process comprising:
 a) exposing carbon nanotubes comprising metal impurities to flowing carbon monoxide gas;
 b) raising the temperature of the carbon nanotubes and flowing carbon monoxide from about 20° C. to a maximum temperature of 200° C. or lower, to produce volatile metal species and carbon monoxide-treated nanotubes;
 c) transporting the volatile metal species away from the carbon monoxide-treated carbon nanotubes; and
 d) isolating the carbon monoxide-treated carbon nanotubes.

DETAILED DESCRIPTION

The processes of the invention disclosed herein remove metal impurities, such as metal-based catalyst residues from carbon nanotubes (CNTs) under mild, reducing conditions. In some embodiments, the processes have the effect of reducing the catalyst metal concentrations in the resulting CNT product, but do not substantially affect amorphous carbon or the nature of the carbon nanotubes present in the mixture.

One embodiment is a method for extracting contaminant metals from carbon nanotubes using an active metal to provide a reducing environment and carbon monoxide to serve as an extracting ligand. The contaminant metal is removed from the carbon nanotubes as a soluble metal complex and the thus-formed de-metallated carbon nanotubes are then isolated.

In the processes disclosed herein, the carbon nanotubes containing the metal residues are exposed to an active metal agent prior to the exposure to CO. As used herein, an "active metal agent" includes metals whose reduction reaction has a value 2.3 or more volts more negative than that of the standard hydrogen electrode. Suitable metals include lithium, sodium, potassium, cesium, and magnesium. Organometallic compounds, and in particular, metal alkyl compounds, are also suitable active metal agents. Thus, lithium alkyls, magnesium alkyls and zinc alkyls—for example, butyl lithium, dibutylmagnesium and diethylzinc—are suitable active metal agents. Aluminum and boron alkyls are also suitable.

Exposure of the carbon nanotubes to the active metal agent typically takes place in a first suspension (a slurry) comprising the carbon nanotubes, a suitable solvent and optional other components. Exposure of the slurry to ultrasonic energy can be beneficial. The slurry can also be heated, with or without sonication. The reaction mixture formed by contacting the carbon nanotube slurry with the active metal agent is referred to herein as the "second suspension."

In one embodiment, the slurry of carbon nanotubes is also sonicated before the addition of the active metal agent.

In one embodiment, an electron-transporting species (e.g., naphthalene, anthracene or phenanthrene) is added to the slurry before sonication or heating.

When the second suspension is contacted with carbon monoxide, metals such as Ni, Co, Mo, Cr and Fe can readily be removed as their respective carbonyl complexes. Suitable temperatures typically include 0-150° C. It is generally preferred to work at or above room temperature and the upper temperature limit is largely determined by the decomposition temperature of the metal carbonyl(s) being formed. In one embodiment, the reaction is carried out between 20 and 100° C.

Exposure of the second suspension to carbon monoxide is conveniently carried out at one atmosphere gas pressure (101 kilopascal), but the pressure can range from 10 to 10,000 kilopascal. Gaseous CO dissolves in the solvent, where it serves to extract the metallic catalyst residues. The gas need not be pure carbon monoxide; for example, it can be diluted with nitrogen or other inert gas, or with hydrogen.

Exposure of metal-contaminated CNTs to CO can form volatile, and in some cases, toxic metal carbonyl species. Suitable precautions known to those skilled in the art can be taken to avoid exposure to $Fe(CO)_5$ or $Ni(CO)_4$.

The exposure of the carbon nanotubes to CO is carried out in a suspension comprising the CNTs and one or more liquid organic species, herein termed "solvents," even though the carbon nanotubes do not typically dissolve in these organic liquids. Suitable first and second solvents include aromatic solvents, i.e., hydrocarbon liquids that contain one or more benzene rings. Aromatic solvents can be unsubstituted or substituted with any functionality that does not interfere with the metal removal process. Suitable functionalities include branched and linear alkyl and ether groups. Examples of suitable aromatic solvents include benzene, toluene, ethylbenzene, xylenes, mesitylene and mixtures thereof. Suitable first and second solvents also include non-aromatic solvents that are known to solubilize metal cations. Tetrahydrofuran and dioxane are particularly suitable. Functionalities such as hydroxyl, aldehyde, and carboxylate interfere with the process through reaction with the active metal and thus are not suitable. Solvents such as ketones, aldehydes, alcohols, water, and organic acids and their esters are known to react rapidly with active metals and are thus not suitable for use in the slurry.

The suspensions can further comprise one or more "adjuvant ligands." Examples of adjuvant ligands include P- or N-containing ligands such as: triphenylphosphine; 1,10-phenanthroline; 2,2'-bipyridyl; triphenylphosphite; and 1,2-bis(diphenylphosphine)ethane. Use of such ligands can facilitate the removal of metals by forming more stable CO complexes.

After the metallic residues have been converted to soluble species by reaction with an active metal agent and CO, the de-metallated carbon nanotubes can be isolated by any of a variety of means. Filtration through a fine-pored filter is particularly convenient, with the CNTs remaining on the filter. Alternatively, one can centrifuge the CNT suspension and decant the supernatant solvent from the compacted carbon nanotubes.

Following the metal removal, one can re-suspend the CNTs in a solvent that is more compatible with the end-use application of the carbon nanotubes. For some applications, it is useful to handle the CNTs in a relatively volatile solvent or in a polar solvent that may not have been appropriate for the initial CO-based extraction process. Thus it may be useful to replace the extraction solvent with a new solvent by washing the isolated CNT mass with the new solvent. For example, ethyl acetate can be used to wash the isolated carbon nanotubes if the carbon nanotubes are going to be used in a photoimageable paste formulation. Typically, the replacement of the extraction solvent is accomplished without allowing the isolated mass of carbon nanotubes to dry.

In one embodiment, the isolated CNTs can be dried and optionally annealed. "Annealing" refers to a process in which the CNTs are heated under an inert atmosphere to temperatures ranging from about 700 to 1000° C. Alternatively, it may be useful to keep the CNTs wet or damp with solvent to facilitate safe handling.

The processes disclosed herein can be used to reduce metal impurities in CNTs from 5-30 wt % to less than about 1 wt %, which is sufficient to allow the use of the CNTs in many advanced applications, such as composite materials, sensors, and nanoelectronic building blocks. While typically applied to unpurified CNT materials, the processes can also be applied to CNT materials that have been at least partially purified by another method prior to being subjected to the processes herein.

The processes described herein possess several advantages over existing methods. The processes yield CNTs with significantly reduced metal loadings and in high yield (80-90%). The reagents used typically have high selectivity toward the removal of metals and are also non-destructive to carbon nanotubes. By converting the metallic impurities into soluble or volatile metal complexes, the impurities are readily removed.

Further, the processes can be carried out as a solution-based process, involving mild conditions (e.g., 20-150° C.). It can be practiced as a batch, semibatch or continuous process (using continuous centrifugation to isolate the purified CNTs).

It has been found that passing CO gas over a heated sample of impure CNT material can remove some metal impurities. In one embodiment of such a process, no solvent or active metal agent is required. In one embodiment of the process, the temperature for CO exposure is within the range of 50 of 200° C. In another embodiment, the CNTs are exposed at elevated temperatures (>500° C.) to vapors of a lower-boiling active metal such as Na, K, Rb, or Cs, then cooled to temperatures of 50 to 200° C., and then exposed to CO. In one embodiment of the invention, the flow of CO gas serves to transport the metal carbonyls out of the reaction area.

The CNTs produced can be used in a variety of applications, such as an electrode of a fuel cell or battery, a heat sink or heat spreader, a metal-matrix composite or polymer-matrix composite in a printed circuit or as an electron emitter in a field emission display. Useful formulations of the CNTs include: dispersions in a gas; dispersions in a liquid; dispersions in a solid; powders; pastes; and colloidal suspensions.

The processes can be used to make a paste containing the purified CNTs that is suitable for screen printing. "Screen printing" is a well-known printing technique. A printing screen is made of a piece of porous, finely woven stainless steel screen stretched over a frame. Areas of the screen may be blocked off with a non-permeable material to form a stencil, which is a positive of the image to be printed; that is, the open spaces are where the paste or ink will appear. Alternatively, the screen printing process may simple be used to print a uniform coat across the entire surface of a substrate. The screen is placed atop the substrate such as glass or ITO. In a typical process, the screen-printable paste is placed on top of the screen, and a fill bar is used to fill the mesh openings with ink. The fill bar begins at the rear of the screen and behind a reservoir of ink. The screen is lifted to prevent contact with the substrate and then using a slight amount of downward force the fill bar is pulled to the front of the screen. This fills the mesh openings with ink and moves the paste reservoir to the front of the screen. A rubber blade moves the mesh down to the substrate as it is pushed to the rear of the screen. The paste that is in the mesh opening is transferred by capillary action to the substrate in a controlled and prescribed amount. One of more passes of the squeegee may be required.

The paste used for screen printing typically contains carbon nanotubes, an organic medium, solvent, surfactant and either low softening point glass frit, metallic powder or metallic paint or a mixture thereof. The role of the medium and solvent is to suspend and disperse the particulate constituents, i.e., the solids, in the paste with a proper rheology for typical patterning processes such as screen printing. There are many such mediums known in the art. Examples of resins that can be used are cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements. A surfactant can be used to improve the dispersion of the particles. Organic acids such oleic and stearic acids and organic phosphates such as lecithin or Gafac® phosphates are typical surfactants.

A glass frit that softens sufficiently at the firing temperature to adhere to the substrate and to the carbon nanotubes is often employed. A lead or bismuth glass frit can be used as well as other glasses with low softening points such as calcium or zinc borosilicates. Within this class of glasses, the specific composition is generally not critical. If a screen printable composition with higher electrical conductivity is desired, the paste also contains a metal, for example, silver or gold. The paste typically contains about 40 wt % to about 80 wt % solids based on the total weight of the paste. These solids comprise acicular carbon and glass frit and/or metallic components. Variations in the composition can be used to adjust the viscosity and the final thickness of the printed material.

The emitter paste is typically prepared by three-roll milling a mixture of carbon nanotubes, organic medium, surfactant, a solvent and low softening point glass frit, metal oxide, metallic powder or metallic paint or a mixture thereof.

The paste mixture can be screen printed by using a 165-400-mesh stainless steel screen. The paste can be deposited as a continuous film or in the form of a desired pattern. When the substrate is glass, the paste is then fired in nitrogen or air. Higher firing temperatures can be used with substrates which can endure them provided the atmosphere is substantially free of oxygen. However, the organic constituents in the paste are effectively volatilized at 350-450° C., leaving the layer of composite comprised of carbon nanotubes and glass and/or metallic conductor. The carbon nanotubes appear to undergo no appreciable oxidation or other chemical or physical change during the firing in nitrogen. Firing in air causes some oxidation, but oxidation is reduced when the concentration of metallic impurities is minimized.

In one embodiment, the polymer binder can be a "photopolymerizable paste." The photopolymerizable paste is printed as a uniform layer across the substrate and then the image is generated by photoimaging processes. The non-exposed portions of the image can be removed by washing, leaving the desired image on the substrate. A particularly advantageous pattern is an organized array of dots to be used as a multiplicity of field electron emitters for a display device. A screen-printed paste to be photopatterned contains a photoinitiator, a developable binder and a photohardenable monomer comprised, for example, of at least one addition polymerizable ethylenically unsaturated compound having at least one polymerizable ethylenic group. In one embodiment, a paste composition for use as a screen printable paste contains solids comprising carbon nanotubes, wherein the carbon nanotubes are less than 9 wt % of the total weight of solids in the paste. In another embodiment, the carbon nanotubes comprise less than 5 wt % of the total weight of solids in the paste. In a further embodiment, the carbon nanotubes comprise less than 1 wt % of the total weight of solids in the paste. The pastes are useful in fabricating electron field emitters.

"Electron field emitters" or "electron field emission devices" containing the carbon nanotubes can be used in the cathodes of electronic devices such as triodes and in particular in field emission display devices. Such a display device comprises (a) a cathode using an electron field emitter formulated with the de-metallated carbon nanotubes described herein, (b) a patterned optically transparent electrically conductive film serving as an anode and spaced apart from the cathode, (c) a phosphor layer capable of emitting light upon bombardment by electrons emitted by the electron field emitter and positioned adjacent to the anode and between the anode and the cathode, and (d) one or more gate electrodes disposed between the phosphor layer and the cathode. The use of an adhesive material to improve the emission properties of an electron field emitter is readily adapted to large size electron field emitters that can be used in the cathodes of large size display panels. The electron field emitter may be a continuous area or may be a plurality of electron field emitters printed as a series of dots or other patterns. The electron field emitters may be addressed together to provide general lighting or may be addressed as individual emitters to provide information display.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

The carbon nanotubes used for these examples were either grown by the laser-furnace ablation technique according to U.S. Pat. No. 6,183,714 B1 or were purchased from Sigma Aldrich (St. Louis, Mo.). Metal residue levels in the CNTs were determined by ashing at 600° C., dissolving the residue in aqua regia (3:1 mix of HCl and HNO3 in water), and then using Inductively Coupled Plasma (ICP) elemental analysis. Unless otherwise stated, all operations other than final isolations were carried out in the nitrogen atmosphere of a drybox (Vacuum Atmospheres, Hawthorne, Calif.) or using standard airless techniques. CNTs were isolated in a standard fume hood using techniques appropriate for the handling of nanomaterials. All solvents, metals and organometallics were obtained from Aldrich. Unless otherwise stated, percentages of materials are weight percent and temperatures are in degrees Celsius.

Example 1

Cobalt and Nickel Removal from CNTs

This example demonstrates the removal of nickel and cobalt catalyst residues from a sample of CNTs.

A sample of laser furnace CNTs (390 mg) containing about 5 wt % Co and 5 wt % Ni catalyst residues was slurried in mesitylene (120 ml) and then sonicated at full power 50% duty cycle for 5 min. Then a sample of potassium metal (about 240 mg), cut into many small pieces with fresh metal surfaces exposed, was added to the mixture. Sonication was resumed at full power with a 50% duty cycle for 60 min. The CNT-K suspension in mesitylene was brought out of the drybox under nitrogen and exposed to air for several hours. It was then connected to a flow of CO (bubbled through), which egressed through an oil bubbler. The temperature was increased stepwise from 50 to 75 to 100° C. holding at each temperature for about 45 minutes. The time required to attain each set temperature was about 15 minutes. Upon cooling to room temperature, the CNTs were isolated by filtration and washed with ethyl acetate (2×25 mL) before submitting for ICP analysis of Co and Ni content. The sample was analyzed for 0.95 and 0.97 wt % Co and Ni, respectively.

Comparative Example A

Cobalt and Nickel Removal from CNTs

This example demonstrates the attempted removal of nickel and cobalt catalyst residues from a sample of CNTs without prior exposure to an active metal agent.

A sample of laser furnace CNTs (390 mg) containing about 5 wt % Co and 5 wt % Ni catalyst residues was slurried in mesitylene (120 ml), and then sonicated at full power 50% duty cycle for 5 min. The CNT suspension in mesitylene was brought out of the drybox under nitrogen and exposed to air for several hours. It was then connected to a flow of CO (bubbled through), which egressed through an oil bubbler. The temperature was increased stepwise from 50 to 75 to 100° C. holding at each temperature for about 45 minutes. The time required to attain each set temperature was about 15 minutes. Upon cooling to room temperature, the CNTs were isolated by filtration and washed with ethyl acetate (2×25 mL) before submitting for ICP analysis of Co and Ni content. The sample analyzed for 3.10 and 3.08 wt % Co and Ni, respectively.

Example 2

Cobalt and Nickel Removal from CNTs

The procedure described for Example 1 was repeated using 141 mg of CNT and 0.061 g of potassium, except that there was no intervening exposure to air. The analytical results were 0.93 and 0.98 wt % Co and Ni, respectively. This result is very similar to the result with an intermediate exposure to air, showing that it had little effect.

Example

Cobalt and Nickel Removal from CNTs

This example demonstrates the removal of nickel and cobalt catalyst residues from a sample of CNTs.

A sample of laser furnace CNTs (410 mg) containing about 3.90 wt % Co and 3.95 wt % Ni catalyst residues was slurried in mesitylene (120 ml) and then sonicated at full power 50% duty cycle for 5 min. Then a sample of potassium metal (about 260 mg), cut into many small pieces with fresh metal surfaces exposed, was added to the mixture. Sonication was resumed at full power with a 50% duty cycle for 60 min. The CNT-K suspension in mesitylene was brought out of the drybox under nitrogen and CO was bubbled through the suspension. The temperature was increased stepwise from 50 to 75 to 100° C. holding at each temperature for about 45 minutes. The time required to attain each set temperature was about 15 minutes. Upon cooling to room temperature, the CNTs were isolated by filtration, giving a clear colorless filtrate. The CNTs were washed with ethyl acetate (2×25 mL) before submitting for ICP analysis of Co and Ni content, giving 0.47 wt % and 0.47 wt % respectively.

Example 4

Iron and Molybdenum Removal from CNTs

This example demonstrates the removal of iron and molybdenum catalyst residues from a sample of CNTs.

A sample of MWNTs (160 mg; OD=3-10 nm, ID=1-3 nm, length=0.1-10 μm, Aldrich 63, 654-1) containing about 1.09 wt % Fe and 0.22 wt % Mo catalyst residues was slurried in mesitylene (120 ml) and then sonicated at full power 50% duty cycle for 5 min. Then a sample of potassium metal (about 43 mg), cut into many small pieces with fresh metal surfaces exposed, was added to the mixture. Sonication was resumed at full power with a 50% duty cycle for 60 min. The CNT-K suspension in mesitylene was brought out of the drybox under nitrogen, and CO was bubbled through the suspension. The temperature was increased stepwise from 50 to 75 to 100° C. holding at each temperature for about an hour. The time required to attain each set temperature was about 15 minutes. Upon cooling to room temperature, the CNTs were isolated by filtration, giving a clear, green filtrate. The CNTs were washed with ethyl acetate (2×25 mL) before submitting for ICP analysis of Fe and Mo content, giving 0.30 wt % and 0.07 wt %, respectively.

Examples 5-14

Catalyst Removal from CNTs

The examples shown in Table 1 demonstrate that a variety of solvents, active metal agents and additives can be employed to remove catalyst residues from a variety of carbon nanotubes. Examples 5-12 used the laser ablation carbon nanotubes. All of the experiments were carried out essentially as in Example 4. Example 13 used commercial multiwall carbon nanotubes (Aldrich 63, 654-1, OD=3-10 nm, ID=1-3 nm, length=0.1-10 μm). Example 14 used commercial multiwall carbon nanotubes (Aldrich 63, 664-9), OD=20-50 nm, wall thickness=1-2 nm, length=0.5-2 μm).

TABLE 1

Examples 5-14

| Example No. | Active Metal Agent | Solvent | Adjuvant Ligand | Starting wt % metal 1 | Starting wt % metal 2 | Ending wt % metal 1 | Ending wt % metal 2 |
|---|---|---|---|---|---|---|---|
| 5 | Li | THF | — | 3.96 Ni | 3.90 Co | 1.81 | 1.82 |
| 6 | K | mesitylene | — | 3.96 Ni | 3.90 Co | 1.18 | 1.14 |
| 7 | K | mesitylene | 1,10-Phenanthroline | 3.96 Ni | 3.90 Co | 2.67 | 2.65 |
| 8 | Li | mesitylene | Naphthalene | 3.96 Ni | 3.90 Co | 2.87 | 2.90 |
| 9 | Cs | mesitylene | — | 3.96 Ni | 3.90 Co | 0.72 | 0.69 |
| 10 | Mg | THF | — | 3.96 Ni | 3.90 Co | 2.17 | 2.16 |
| 11 | K | Toluene | — | 3.96 Ni | 3.90 Co | 0.98 | 0.92 |

TABLE 1-continued

Examples 5-14

| Example No. | Active Metal Agent | Solvent | Adjuvant Ligand | Starting wt % metal 1 | Starting wt % metal 2 | Ending wt % metal 1 | Ending wt % metal 2 |
|---|---|---|---|---|---|---|---|
| 12 | K | 1,4-dioxane | | 3.96 Ni | 3.90 Co | 0.79 | 0.74 |
| 13 | K | mesitylene | | 1.09 Fe | 0.22 Mo | 0.03 | 0.07 |
| 14 | K | mesitylene | | 1.55 Ni | — | 0.84 | — |

Example 15

Cobalt and Nickel Removal from CNTs Using Butyl Lithium

This example demonstrates the removal of nickel and cobalt catalyst residues using butyl lithium as an active metal agent.

A sample of laser furnace CNTs (117 mg) containing about 3.90 wt % Co and 3.95 wt % Ni catalyst residues was slurried in mesitylene (120 ml) and then sonicated at full power 50% duty cycle for 5 min. Then a sample of 1.6 M butyl lithium in hexanes (about 5 mL) was added drop-wise to the mixture. Sonication was resumed at full power with a 50% duty cycle for 60 min. The CNT-BuLi suspension in mesitylene was brought out of the drybox under nitrogen and connected to a flow of CO (bubbled through), that egressed through an oil bubbler. The temperature was increased stepwise from 50 to 75 to 100° C. holding at each temperature for about an hour. The time required to attain each set temperature was about 15 minutes. Upon cooling to room temperature, the CNTs were isolated by filtration giving a black, turbid filtrate. The CNTs were washed with ethyl acetate (2×25 mL) before submitting for ICP analysis of Co and Ni content, giving 0.97 wt % and 0.95 wt %, respectively.

Example 16

Cobalt and Nickel Removal from CNTs Using Dibutylmagnesium

Laser ablated CNTs (103 mg) and mesitylene (40 mL) were added to a glass jar in a drybox, resulting in a black suspension, which was sonicated at full power and 50% duty cycle for 5 min. Di-n-butylmagnesium (2 mL) was added to the sonicated mixture. The mixture was further sonicated at full power and 50% duty cycle for 90 min. The warm, black suspension was transferred to a 100 mL, 3-neck, round-bottomed flask equipped with stir bar, glass thermo-well, gas adapter, and septum for injection. The reaction flask was brought out of the drybox under nitrogen and connected to a flow of CO (0.05 liters/min flow rate), which was bubbled through and allowed to egress through an oil bubbler. The temperature was increased stepwise from 50 to 75 to 100° C. holding at each temperature for about an hour. The time required to attain each set temperature was about 15 minutes. The CNTs were isolated via filtration and washed with ethyl acetate (2×25 mL), transferred to a vial, and submitted for ICP analysis. The starting metal concentrations were: cobalt: 3.90 wt % and nickel: 3.96 wt %. The final metal concentrations were: cobalt: 0.66 wt % and nickel: 0.65 wt %.

Example 17

Cobalt and Nickel Removal from CNTs Using Diethylzinc

Laser ablated CNTs (105 mg) and mesitylene (40 mL) were added to a glass jar in a drybox, resulting in a black suspension, which was sonicated at full power and 50% duty cycle for 5 min. Diethylzinc (2 mL) was added to the sonicated mixture. The mixture was further sonicated at full power and 50% duty cycle for 90 min. The warm, black suspension was transferred to a 100 mL, 3-neck, round-bottomed flask equipped with stir bar, glass thermo-well, gas adapter, and septum for injection. The reaction flask was brought out of the drybox under nitrogen and connected to a flow of CO (0.05 liters/min flow rate), which was bubbled through and allowed to egress through an oil bubbler. The temperature was increased stepwise from 50 to 75 to 100° C. holding at each temperature for about an hour. The time required to attain each set temperature was about 15 minutes. The CNTs were isolated via filtration and washed with ethyl acetate (2×25 mL), transferred to a vial, and submitted for ICP analysis. The starting metal concentrations were: cobalt: 3.90 wt % and nickel: 3.96 wt %. The final metal concentrations were: cobalt: 1.35 wt % and nickel: 1.41 wt %.

Example 18

Formulation of CNT Paste and Preparation of a Field Emission Display

Laser-ablation grown single wall carbon nanotubes were purified as described in Example 1. The carbon nanotube powder was sonicated in a mixture of ethyl acetate and terpineol to create a slurry which was then incorporated into photoimageable paste components via roll-milling. Fodel® photoimageable paste is available from E. I. du Pont de Nemours and Company, Wilmington, Del. It contains a photoinitiator and photomonomers. The resulting paste was then screen printed onto patterned ITO-coated glass substrates, 2"×2" in size. The paste was imaged pattern-wise with exposure to UV light (100 mJ/cm2) and developed in a 4:1 NMP:H2O solution for ~1 min. and then rinsed with deionized water to reveal the dots patterned onto the substrate. The samples were then fired in a belt furnace in either N2 at 420° C. or air at 400° C. The peak time at temperature in either case was on the order of 17 minutes. After firing, the carbon nanotube Fodel® composition forms an adherent coating on the substrate.

To test for emission, a layer of material was removed from the surface of the fired substrates using a tape activation process (US 200610049741 A1) in which a piece of Scotch® Magic® Tape, (#810, 3M Company) was applied to and contacted with the electron field emitter and then removed. The substrate was then placed into a diode configuration with an ITO-coated phosphor plate at a separation of 620 μm. The diode was placed into a vacuum chamber and electrically connected to a voltage source and an ammeter. The chamber was pumped to ~$3.5 \times 10^{-6}$ Torr. An automated system was used to increase the voltage applied to the diode (from 0 to up to 3200V) while measuring the resulting emission current. The field required to obtain 36 μA was under 2 V/μm for the sample fired in nitrogen and 3.6 V/μm for the sample fired in air. Samples with higher loadings of metal generally emit under similar conditions when fired in nitrogen, but often will not emit at all when fired in air.

Example 19

Vapor-Transport of Volatile Metal Species Away from CNTs

A sample of laser grown carbon nanotubes (about 0.1 g) was placed in an alumina boat (Coors, Boulder, Colo.) and the boat was inserted into a quartz tube. The quartz tube was placed into a tube furnace (Lindberg, Watertown, Wis.). The quartz tube was then flushed with carbon monoxide. With a constant CO flush, the temperature of the furnace was slowly ramped over a period of two hr to 200° C., and then held at that temperature for another hour. The sample was then allowed to cool slowly with continued CO flush. Upon opening the furnace, it was observed that some of the metal formerly on the CNTs was now on the walls of the quartz tube as a fine mirror downstream from the CNTs. Volatile metal species had been transported away from the CNTs.

What is claimed is:

1. A process comprising:
   a) forming a first suspension of carbon nanotubes containing metal residues in a first solvent;
   b) contacting the first suspension with an active metal agent to form a second suspension of carbon nanotubes containing metal residues;
   c) contacting the second suspension with carbon monoxide gas to form carbon monoxide-treated carbon nanotubes; and
   d) isolating the carbon monoxide-treated carbon nanotubes;
   wherein steps (a), (b) and (c) are performed in an airless atmosphere.

2. The process of claim 1, wherein the second suspension further comprises one or more adjuvant ligands.

3. The process of claim 2, wherein the adjuvant ligand is selected from the group consisting of 1,10-phenanthroline, 2,2'-bipyridyl, triphenylphosphine and 1,2-bis(diphenylphosphino)ethane.

4. The process of claim 1, wherein isolating the carbon nanotubes comprises: a) filtering; or b) centrifuging and decanting.

5. The process of claim 1, wherein the process further comprises, after isolating the carbon nanotubes, replacing the first solvent with a second solvent.

6. The process of claim 1, wherein the process further comprises annealing the carbon monoxide-treated carbon nanotubes.

7. The process of claim 1, wherein the second suspension is sonicated.

8. The process of claim 1, wherein the active metal agent is selected from the group consisting of lithium, sodium, cesium, rubidium, magnesium, potassium and combinations thereof.

9. The process of claim 1, wherein the active metal agent is an organometallic compound.

10. The process of claim 9, wherein the organometallic compound is a lithium alkyl, magnesium alkyl, aluminum alkyl, boron alkyl, zinc alkyl or combination thereof.

11. The process of claim 1, wherein the carbon nanotubes are made by laser ablation.

12. The process of claim 1, wherein the carbon nanotubes are made by chemical vapor deposition.

13. The process of claim 1 wherein the metal residues comprise catalyst metal residues.

14. A composition comprising the isolated carbon nanotubes made by the process of claim 1.

15. A screen printable paste comprising the composition of claim 14, a solvent, and a binder.

16. A photopolymerizable paste comprising the composition of claim 14, a solvent, a binder, a photoinitiator, a developable binder and a photohardenable monomer.

17. An electron field emission device comprising the composition of claim 14.

18. A plurality of field emitters comprising the composition of claim 14.

* * * * *